United States Patent
Samudrala et al.

(10) Patent No.: US 10,662,793 B2
(45) Date of Patent: May 26, 2020

(54) TURBINE WHEEL COVER-PLATE MOUNTED GAS TURBINE INTERSTAGE SEAL

(71) Applicant: General Electric Company, Schenectady, NY (US)

(72) Inventors: Omprakash Samudrala, Clifton Park, NY (US); Edip Sevincer, Watervliet, NY (US); Jonathan Michael Webster, Travelers Rest, SC (US); Fernando Jorge Casanova, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 14/556,305

(22) Filed: Dec. 1, 2014

(65) Prior Publication Data

US 2016/0153302 A1   Jun. 2, 2016

(51) Int. Cl.
  *F01D 11/00*  (2006.01)
  *F02C 7/28*   (2006.01)
  *F01D 5/30*   (2006.01)

(52) U.S. Cl.
  CPC .......... *F01D 11/001* (2013.01); *F01D 5/3007* (2013.01); *F02C 7/28* (2013.01)

(58) Field of Classification Search
  CPC ...... F01D 11/00; F01D 11/001; F01D 11/003; F01D 11/005; F01D 11/006;
  (Continued)

(56) References Cited

U.S. PATENT DOCUMENTS 2,656,147 A * 10/1953 Brownhill ............... F01D 5/084
                                                         416/97 R
3,295,825 A *  1/1967 Hall, Jr. .................... F01D 5/06
                                                         415/173.7
(Continued)

FOREIGN PATENT DOCUMENTS

CN     103930652 A    7/2014
FR     2 969 209 A1   6/2012

OTHER PUBLICATIONS

Ludwig et al., "Gas Path Sealing in Turbine Engines", A S L E Transactions, Taylor & Francis Online, vol. 23, Issue 1, pp. 1-22, Mar. 25, 2008.
(Continued)

*Primary Examiner* — David E Sosnowski
*Assistant Examiner* — Wayne A Lambert
(74) *Attorney, Agent, or Firm* — Armstrong Teasdale LLP

(57) ABSTRACT

A sealing system for a multi-stage turbine includes multiple first interstage seal subsystems disposed circumferentially about a rotor wheel shaft of the multi-stage turbine and extending axially between a first turbine stage and a second turbine stage of the multi-stage turbine. Each of the first interstage seal subsystems includes multiple near flow path seal segments. The first interstage seal subsystem also includes a forward coverplate disposed axially between a first turbine wheel of the first turbine stage and the near flow path seal segment and an aft coverplate disposed axially between the near flow path seal segment and a second turbine wheel of the second turbine stag. Further, each of the forward coverplate and the aft coverplate extends radially to a first stage bucket and a second stage bucket respectively.

16 Claims, 10 Drawing Sheets

(58) Field of Classification Search
CPC ........ F01D 11/008; F01D 5/30; F01D 5/3007; F01D 5/3015; F02C 7/28
See application file for complete search history.

(56) References Cited

U.S. PATENT DOCUMENTS

| | | | | |
|---|---|---|---|---|
| 3,768,924 | A * | 10/1973 | Corsmeier | F01D 5/081 416/95 |
| 4,088,422 | A * | 5/1978 | Martin | F01D 5/06 415/173.7 |
| 4,127,359 | A * | 11/1978 | Stephan | F01D 11/005 416/198 A |
| 4,189,282 | A * | 2/1980 | Benoist | F01D 5/3015 416/193 A |
| 4,247,257 | A * | 1/1981 | Benoist | F01D 5/3015 416/220 R |
| 4,304,523 | A * | 12/1981 | Corsmeier | F01D 5/3015 29/889.21 |
| 4,309,147 | A * | 1/1982 | Koster | F01D 5/08 415/121.2 |
| 4,645,424 | A | 2/1987 | Peters | |
| 4,884,950 | A | 12/1989 | Brodell et al. | |
| 5,226,785 | A * | 7/1993 | Narayana | F01D 5/02 415/115 |
| 5,232,335 | A * | 8/1993 | Narayana | F01D 5/081 415/115 |
| 5,257,909 | A * | 11/1993 | Glynn | F01D 5/3015 416/219 R |
| 5,338,154 | A * | 8/1994 | Meade | F01D 11/001 403/371 |
| 5,622,475 | A * | 4/1997 | Hayner | F01D 5/3015 416/219 R |
| 5,833,244 | A | 11/1998 | Salt et al. | |
| 6,189,891 | B1 | 2/2001 | Tomita et al. | |
| 6,190,131 | B1 | 2/2001 | Deallenbach | |
| 6,217,279 | B1 | 4/2001 | Ai et al. | |
| 6,506,016 | B1 | 1/2003 | Wang | |
| 6,655,920 | B2 | 12/2003 | Beutin et al. | |
| 7,371,044 | B2 | 5/2008 | Nereim | |
| 7,722,319 | B2 | 5/2010 | Staempfli et al. | |
| 7,857,593 | B2 * | 12/2010 | Garin | F01D 5/027 416/220 R |
| 7,870,742 | B2 | 1/2011 | Lee et al. | |
| 8,162,598 | B2 | 4/2012 | Liang | |
| 8,177,495 | B2 | 5/2012 | Bowes et al. | |
| 8,206,119 | B2 | 6/2012 | Liotta et al. | |
| 8,511,976 | B2 | 8/2013 | Cummins et al. | |
| 8,696,320 | B2 | 4/2014 | Harris, Jr. et al. | |
| 9,624,784 | B2 * | 4/2017 | Hafner | F01D 11/001 |
| 2007/0014668 | A1 | 1/2007 | Engle | |
| 2008/0044284 | A1 | 2/2008 | Alvanos | |
| 2010/0074731 | A1 * | 3/2010 | Wiebe | F01D 11/005 415/173.4 |
| 2010/0074732 | A1 * | 3/2010 | Marra | F01D 5/025 415/173.4 |
| 2010/0178160 | A1 | 7/2010 | Liotta et al. | |
| 2010/0209233 | A1 * | 8/2010 | Wilson | F01D 11/001 415/173.7 |
| 2011/0318187 | A1 * | 12/2011 | Garcia-Crespo | F01D 5/3015 416/220 R |
| 2012/0003079 | A1 | 1/2012 | Farrell et al. | |
| 2012/0027598 | A1 | 2/2012 | Caprario | |
| 2012/0321437 | A1 * | 12/2012 | Hafner | F01D 11/001 415/1 |
| 2013/0259700 | A1 | 10/2013 | Piersall et al. | |
| 2013/0264779 | A1 | 10/2013 | Hafner | |
| 2013/0266447 | A1 * | 10/2013 | Evans | F01D 5/225 416/191 |
| 2014/0308133 | A1 | 10/2014 | Gendraud et al. | |
| 2015/0010393 | A1 * | 1/2015 | Hafner | F01D 11/003 415/173.7 |
| 2015/0114001 | A1 * | 4/2015 | Potter | F01D 11/001 60/791 |

OTHER PUBLICATIONS

Machine Translation and First Office Action and Search issued in connection with corresponding CN Application No. 201510864877.X dated Aug. 31, 2018.

Notice of Reasons of Refusal for related Japanese Patent Application No. 2015-230168, dated Sep. 24, 2019, 7 pages.

* cited by examiner

TURBINE WHEEL COVER-PLATE MOUNTED GAS TURBINE INTERSTAGE SEAL

BACKGROUND

The present application relates generally to gas turbines and more particularly relates to interstage seals within gas turbines.

In general, gas turbine engines combust a mixture of compressed air and fuel to produce hot combustion gases. The combustion gases may flow through one or more turbine stages to generate power for a load and/or compressor. A pressure drop may occur between stages, which may allow leakage flow of a fluid, such as combustion gases, through unintended paths. It is desirable to confine the combustion gases within a defined annular flow path to shield certain rotor parts and to maximize power extraction. Moreover, turbine rotor wheels which support the buckets (blades) are subjected to significant thermal loads during their operating life and thus need to be cooled. Therefore, seals, for example, mechanical seals may be disposed between the stages to reduce fluid leakage between the stages and also prevent the turbine rotor wheels from direct exposure to hot gases. Unfortunately, the seals may not be field maintainable, or a substantial amount of work may be required to replace the seals in the field. In addition, the shape of the seals may make access to internal components of the turbine more difficult. Furthermore, the seals may require additional components, such as spacer wheels between two turbine wheels to ensure proper axial and radial alignment of the seals. Static seals may also be used that require axial extensions from the two turbine wheels which meet in the middle to accommodate the static seal. However, this does not isolate turbine wheel rims from the hot gas path, thereby necessitating higher performance alloys for rotor parts at high cost for withstanding the harsh temperatures in the event of hot gas ingestion. In addition, the static seals cannot be applied to flange bolted rotor architectures, where access to wheel flange bolts is required during assembly/disassembly.

There is therefore a desire for improved interstage sealing systems for gas turbines. Such sealing assemblies should improve overall system efficiency while being inexpensive to assemble, fabricate and providing an increased life for the associated parts.

BRIEF DESCRIPTION

In accordance with an example of the present technology, a sealing system for a multi-stage turbine includes multiple first interstage seal subsystems disposed circumferentially about a rotor wheel shaft of the multi-stage turbine and extending axially between a first turbine stage and a second turbine stage of the multi-stage turbine. Each of the first interstage seal subsystems includes multiple near flow path seal segments. The first interstage seal subsystem also includes a forward coverplate disposed axially between a first turbine wheel of the first turbine stage and the near flow path seal segment and an aft coverplate disposed axially between the near flow path seal segment and a second turbine wheel of the second turbine stage. Further, each of the forward coverplate and the aft coverplate extends radially to a first stage bucket and a second stage bucket respectively.

In accordance with an example of the present technology, a method of assembling a sealing system of a multi-stage turbine is disclosed. The multi-stage turbine includes multiple first stage buckets and multiple second stage buckets disposed on a first turbine wheel and a second turbine wheel respectively. The method includes installing each of the multiple second stage buckets onto each of a plurality of dovetail slots of the second turbine wheel. The method also includes disposing an aft seal wire in a seal wire groove of each of the plurality of aft coverplates. The method further includes mounting a mating portion of each of the plurality of aft coverplates on the extended plurality of second stage buckets by moving the each of the plurality of aft coverplates axially and then radially outward such that a plurality of bucket retention hooks are fully engaged with the mating portion of the aft coverplate, wherein the mating portion comprises a retention hook structure. Furthermore, the method includes sliding the plurality of second stage buckets along with the aft coverplate on the plurality of dovetail slots. The method also includes disposing an aft axial retention ring between a plurality of tab protrusions on an inner diameter of the wheel rim of the second turbine wheel and the aft coverplate for locking the aft coverplate with the second turbine wheel. The method includes mounting a plurality of scalloped L-shaped seats at inner end of each of the plurality of forward coverplates with a plurality of tab protrusions on inner diameter of a wheel rim of the first turbine wheel such that the plurality of scalloped L-shaped seats are completely engaged with the plurality of tab protrusions. Further, the method includes disposing a forward axial retention ring between a plurality of tab protrusions on an inner diameter of the wheel rim of the first turbine wheel and the forward coverplate for locking the forward coverplate with the first turbine wheel. The method includes mounting a forward end and an aft end of each of a plurality of near flow path seal segments on a hook portion of the forward coverplate and a receiving structure of the aft coverplate and installing each of the plurality of first stage buckets onto each of a plurality of dovetail slots of the first turbine wheel.

In accordance with another example of the present technology, a gas turbine system includes a plurality of first stage buckets attached to a first turbine wheel and a plurality of second stage buckets attached to a second turbine wheel. The gas turbine system also includes a plurality of first interstage seal subsystems disposed circumferentially about a rotor wheel shaft of the gas turbine and extending axially between a first turbine stage and a second turbine stage of the gas turbine. Each of the plurality of first interstage seal subsystems includes a plurality of near flow path seal segments. The first interstage seal subsystem also includes a forward coverplate disposed axially between a first turbine wheel of the first turbine stage and the near flow path seal segment and a an aft coverplate disposed axially between the near flow path seal segment and a second turbine wheel of the second turbine stage, wherein each of the forward coverplate and the aft coverplate extends radially to a first stage bucket and a second stage bucket respectively.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
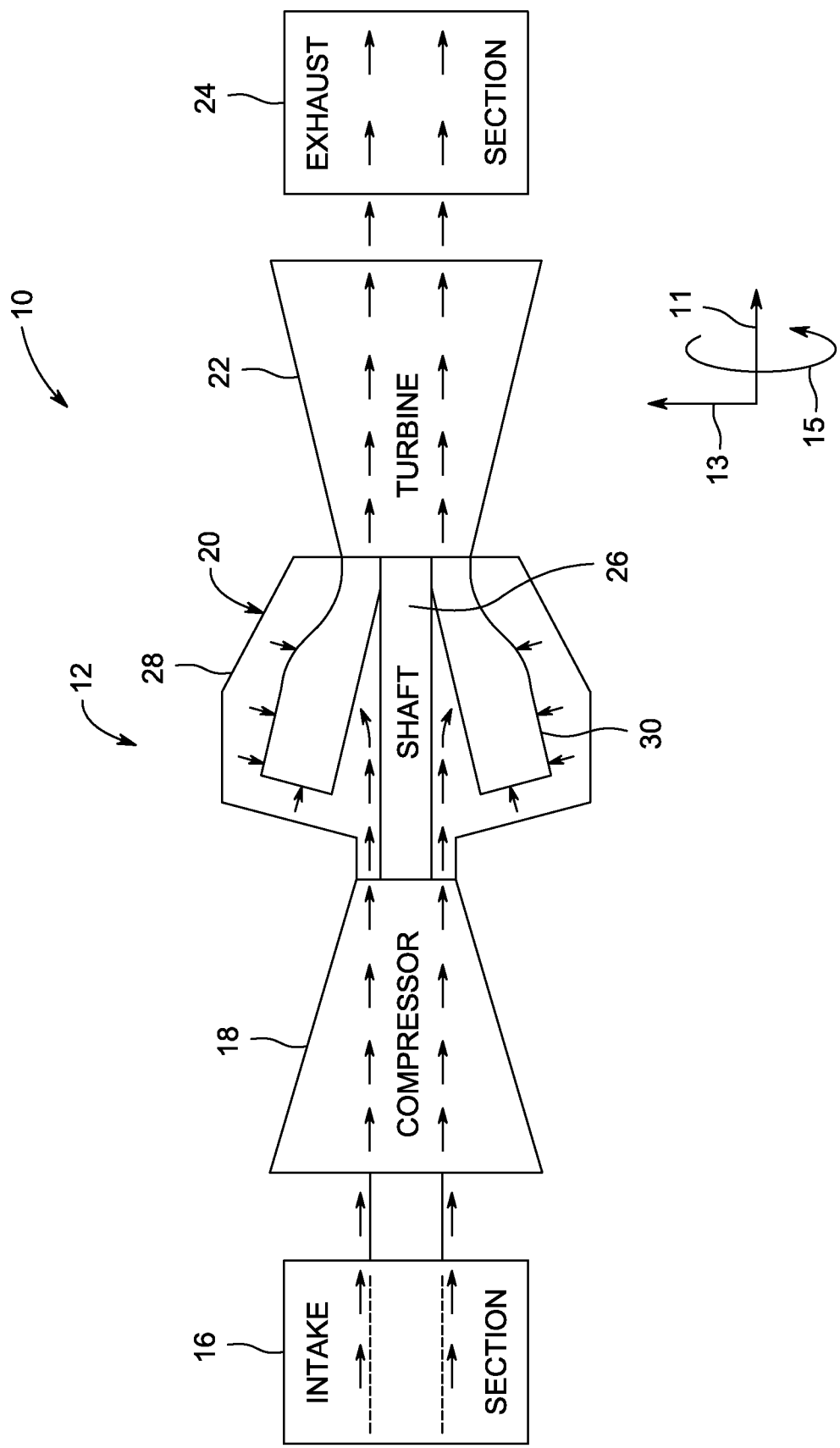
FIG. 1 is a schematic flow diagram of a gas turbine engine that may employ turbine seals in accordance with an example of the present technology.

FIG. 1 is a block diagram of an exemplary system 10 including a gas turbine engine 12 that may employ interstage seals as described in detail below. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30, where the compressed air may mix and combust with fuel within the combustors 30 to drive the turbine 22. From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. As discussed below, the turbine 22 may include a plurality of interstage seal subsystems, which may reduce the leakage of hot combustion gasses between stages of the turbine 22, and reduce the spacing between rotating components of the turbine 22, such as rotor wheels. Throughout the discussion presented herein, a set of axes will be referenced. These axes are based on a cylindrical coordinate system and point in an axial direction 11 (e.g. longitudinal), a radial direction 13, and a circumferential direction 15. Further, the terms "first" and "second" may be applied to elements of the system 10 to distinguish between repeated instances of an element. These terms are not intended to impose a serial or temporal limitation to the corresponding elements.

Figure 2:
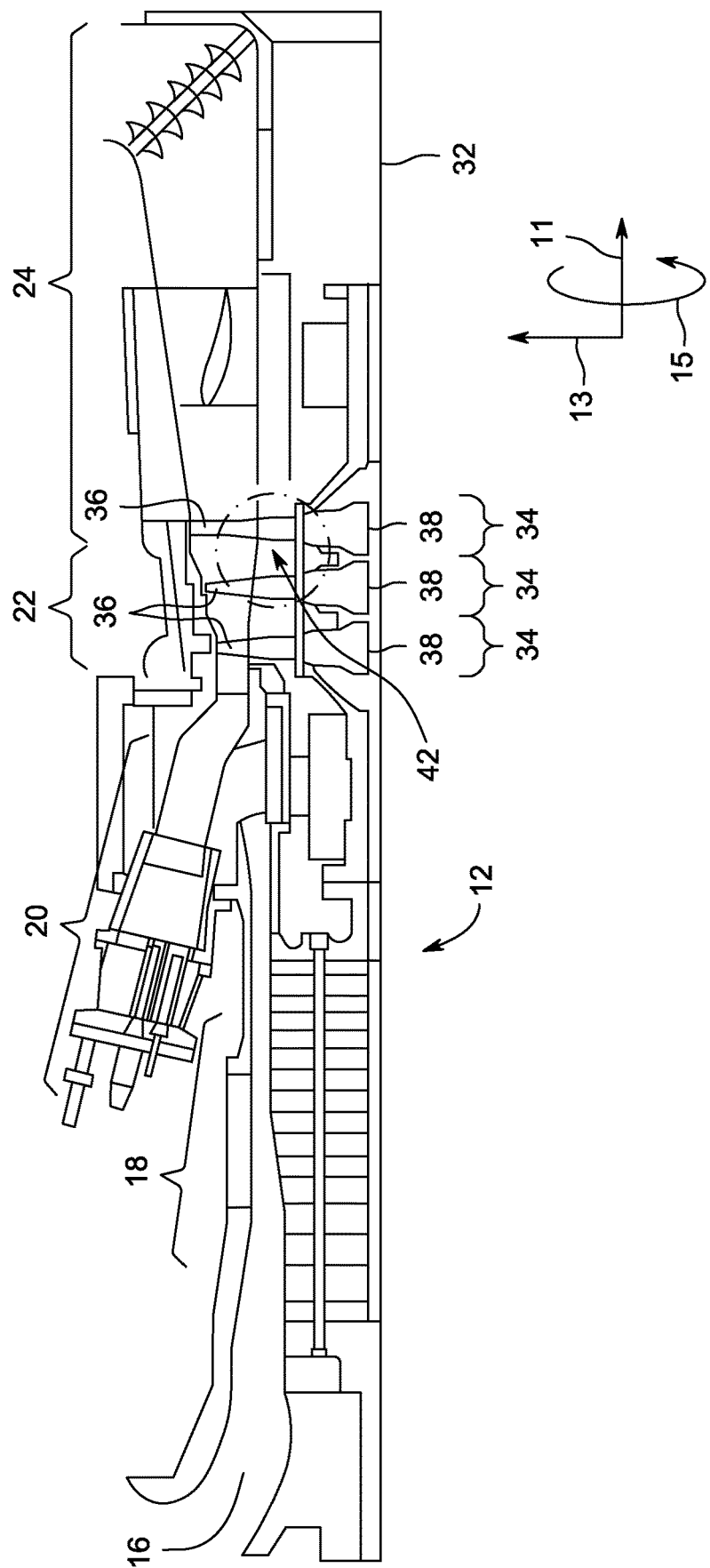
FIG. 2 is a cross-sectional side view of a gas turbine engine taken along a longitudinal axis in accordance with an example of the present technology.

FIG. 2 is a cross-sectional side view of an embodiment of the gas turbine engine 12 of FIG. 1 taken along a longitudinal axis 32. As depicted, the gas turbine 22 includes three separate stages 34; however, the gas turbine 22 may include any number of stages 34. Each stage 34 includes a set of blades 36 coupled to a rotor wheel 38 that may be rotatably attached to the shaft 26 (FIG. 1). The blades 36 extend radially outward from the rotor wheels 38 and are partially disposed within the path of the hot combustion gases through the turbine 22. As described in greater detail below, interstage seal subsystems 42 extend between the stages 34 and are supported by adjacent rotor wheels 38. The interstage seals subsystems 42 may include multiple axial components that wedge against each other. Accordingly, the interstage seal subsystems 42 may be designed to be field maintainable and field replaceable. In addition, the interstage seal subsystems 42 may provide for improved cooling of the stages 34. Although the gas turbine 22 is illustrated in FIG. 2 as a three-stage turbine, the interstage seal subsystems 42 described herein may be employed in any suitable type of turbine with any number of stages and shafts. For example, the interstage seal subsystems 42 may be included in a single turbine system, in a dual turbine system that includes a low-pressure turbine and a high-pressure turbine, or in a steam turbine. Further, the interstage seal subsystems 42 described herein may also be employed in a rotary compressor, such as the compressor 18 illustrated in FIG. 1. The interstage seal subsystem 42 may be made from various high-temperature alloys, such as, but not limited to, nickel based alloys. The interstage seal subsystem 42 may span one to plurality of blades.

In certain embodiments, the interstage volume may be cooled by discharge air bled from the compressor 18 or provided by another source. However, flow of hot combustion gases into the interstage volume may abate the cooling effects. Accordingly, the interstage seal subsystems 42 may be disposed between adjacent rotor wheels 38 to seal and enclose the interstage volume from the hot combustion gases. In addition, the interstage seal subsystems 42 may be configured to direct a cooling fluid to the interstage volume or from the interstage volume toward the blades 36.

Figure 3:
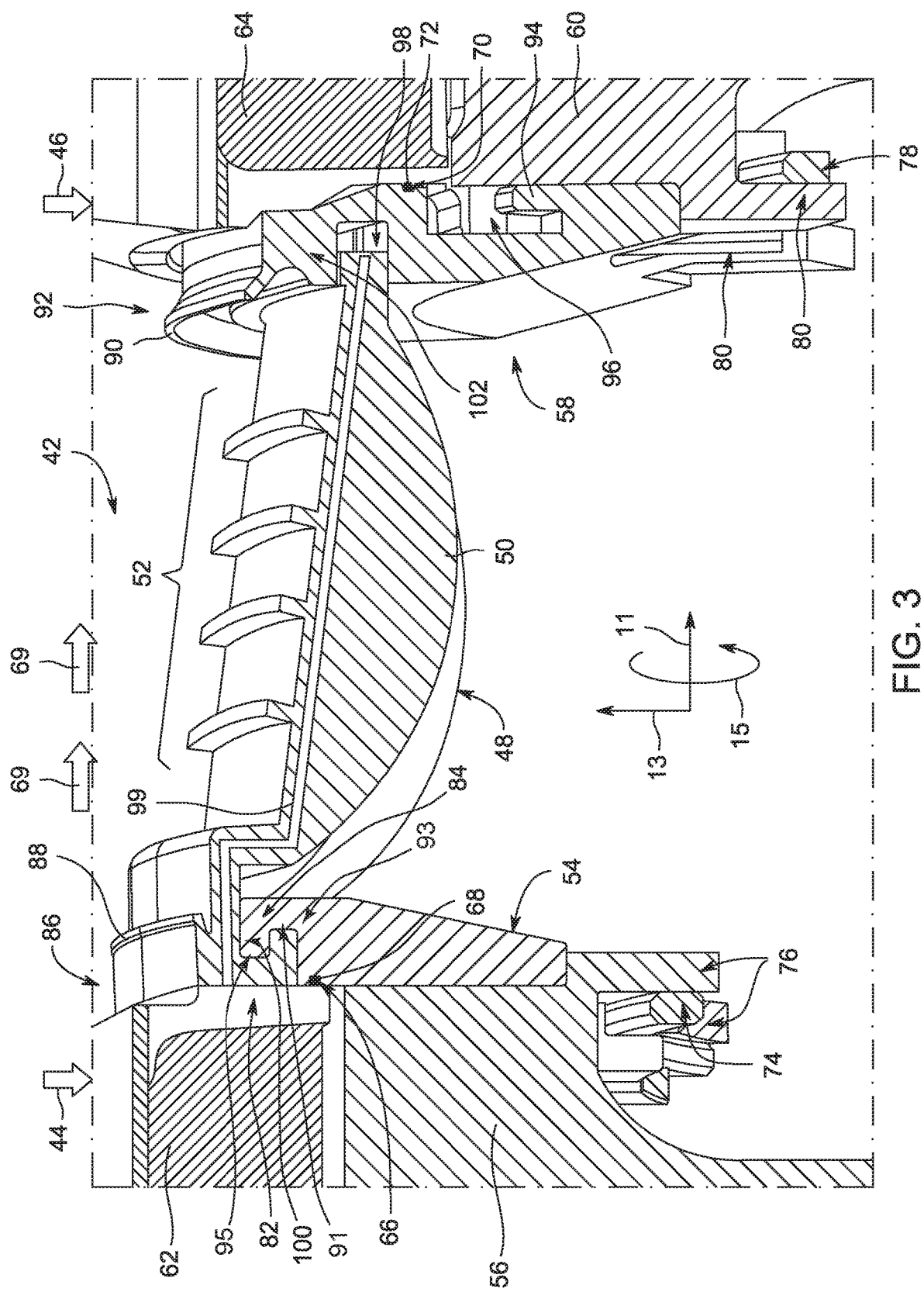
FIG. 3 is a partial perspective view of an interstage seal subsystem of a gas turbine in accordance with an example of the present technology.

FIG. 3 is a partial perspective view of a first interstage seal subsystem 42 of a gas turbine 12 (shown in FIG. 1) in accordance with an example of the present technology. It is to be noted that multiple such first interstage seal subsystems 42 may be disposed circumferentially about a rotor wheel shaft (shown as shaft 26 in FIG. 1) of a multi-stage gas turbine (shown as 12 in FIG. 1) and extends axially between a first turbine stage 44 and a second turbine stage 46 of the multi-stage gas turbine 12 (as shown in FIG. 1). Each of the first interstage seal subsystems 42 includes multiple near flow path seal segments 48. As shown, an optimal geometry of the near flow path seal segment 48 includes a curved bottom end portion 50 and a horizontally straight top end portion 52. In other embodiments, the optimal geometry may vary depending upon the application. The first interstage seal subsystem 42 also includes a forward coverplate 54 disposed axially between a first turbine wheel 56 of the first turbine stage 44 and the near flow path seal segment 48. The first interstage seal subsystem 42 also includes an aft coverplate 58 disposed axially between the near flow path seal segment 48 and a second turbine wheel 60 of the second turbine stage 46. Further, each of the forward coverplate 54 and the aft coverplate 58 extends radially to a first stage bucket 62 and a second stage bucket 64 respectively.

As shown in FIG. 3, the first interstage seal subsystem 42 includes a first seal wire 66 disposed in a seal wire groove 68 of the forward coverplate 54 and located axially between the forward coverplate 54 and the first stage bucket 62 for isolating a wheel rim of the first turbine wheel 56 from a flow of hot gas path 69. The first interstage seal subsystem 42 also includes a second seal wire 70 disposed in a seal wire groove 72 of the aft coverplate 58 and located axially between the aft coverplate 58 and the second stage bucket 64 for isolating the wheel rim of the second turbine wheel 60 from the flow of hot gas path 69. Further, the first interstage seal subsystem 42 includes a forward axial retention ring 74 disposed between a plurality of tab protrusions 76 on the inner diameter of the wheel rim of the first turbine wheel 56 and the forward coverplate 54 for locking the forward coverplate 54 with the first turbine wheel 56. Similarly, the first interstage seal subsystem 42 includes an aft axial retention ring 78 disposed between a plurality of tab protrusions 80 on the inner diameter of the wheel rim of the second turbine wheel 60 and the aft coverplate 58 for locking the aft coverplate 58 with the second turbine wheel 60. Each of the forward axial retention ring 74 and the aft axial retention ring 78 includes a 360 degree ring with a single cut. In certain other embodiments, the retention rings 74, 78 may also be made of a plurality of segments joined to each other by mechanical fasteners such as bolts.

As shown in FIG. 3, a portion 93 of the forward coverplate 54 mounted on the first turbine wheel 56, extends part way along a bucket shank 82 of the first stage bucket 62, forming a hook 84 onto which the near flow path seal segment 48 is mounted towards a forward side 86. The hook 84 includes a base 91 extending radially outward from the portion 93 of the forward coverplate 54. The hook 84 also includes a prong 95 extending axially from the base 91 towards the bucket shank 82. Further, the near flow path seal segment 48 includes an angel wing structure 88 at an outward end towards the forward side 86, while the aft coverplate 58 includes another angel wing structure 90 at an outward end at the aft side 92. Furthermore, the aft coverplate 58 includes a retention hook portion 94 located on a side facing the second turbine wheel 60 for axial retention with each of a bucket retention hook 96 of the second stage buckets 64. As shown in FIG. 3, the aft coverplate 58 includes a receiving structure 98 between angel wing lands for constraining the near flow path seal segment 48 at the aft side 92. When mounted, both ends of the near flow path seal segment 48 are in close contact with a first support land 100 within the hook 84 of the forward coverplate 54 at the forward side 86 and with a second support land 102 within the receiving structure 98 of the aft coverplate 58 at the aft side 92. More specifically, the prong 95 defines the first support land 100 for supporting the mounted near flow path seal segment 48. The first interstage seal subsystem 42 also includes intersegment spline seals 99 located at both sides of the near flow path seal segment for preventing intersegment gap leakages.

Figure 4:
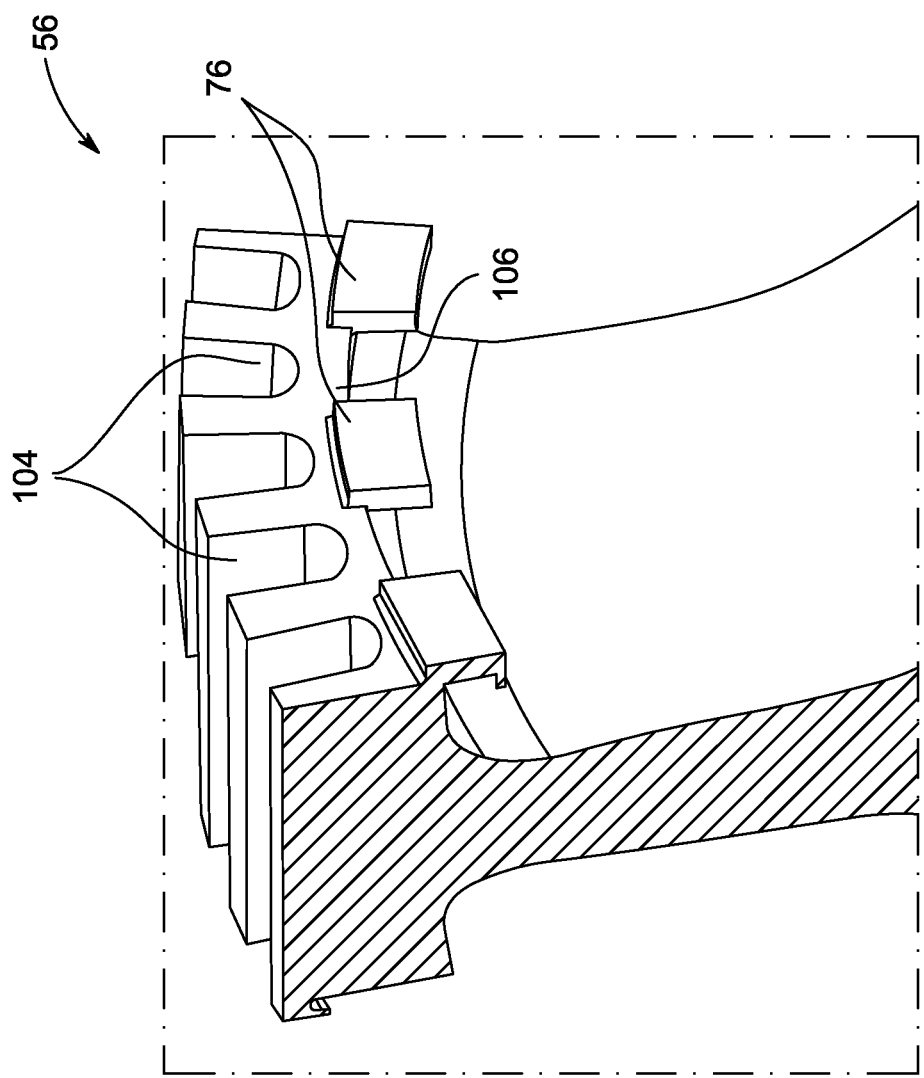
FIG. 4 is a perspective view of the first turbine wheel of the gas turbine in accordance with an example of the present technology.

FIG. 4 is a perspective view of the first turbine wheel 56 of the gas turbine in accordance with an example of the present technology. As shown, the first turbine wheel 56 includes multiple dovetail slots 104 configured for mounting a plurality of buckets or blades (not shown). The first turbine wheel 56 also illustrates the multiple tab protrusions 76 on the inner diameter of the wheel rim 106 in a radially inward direction. As shown, each of the multiple tab protrusions 76 spans to one dovetail slot width circumferentially and is spaced apart by one dovetail slot width. In other embodiments, the span may be a fraction of one dovetail width or a plurality of dovetail widths.

Figure 5:
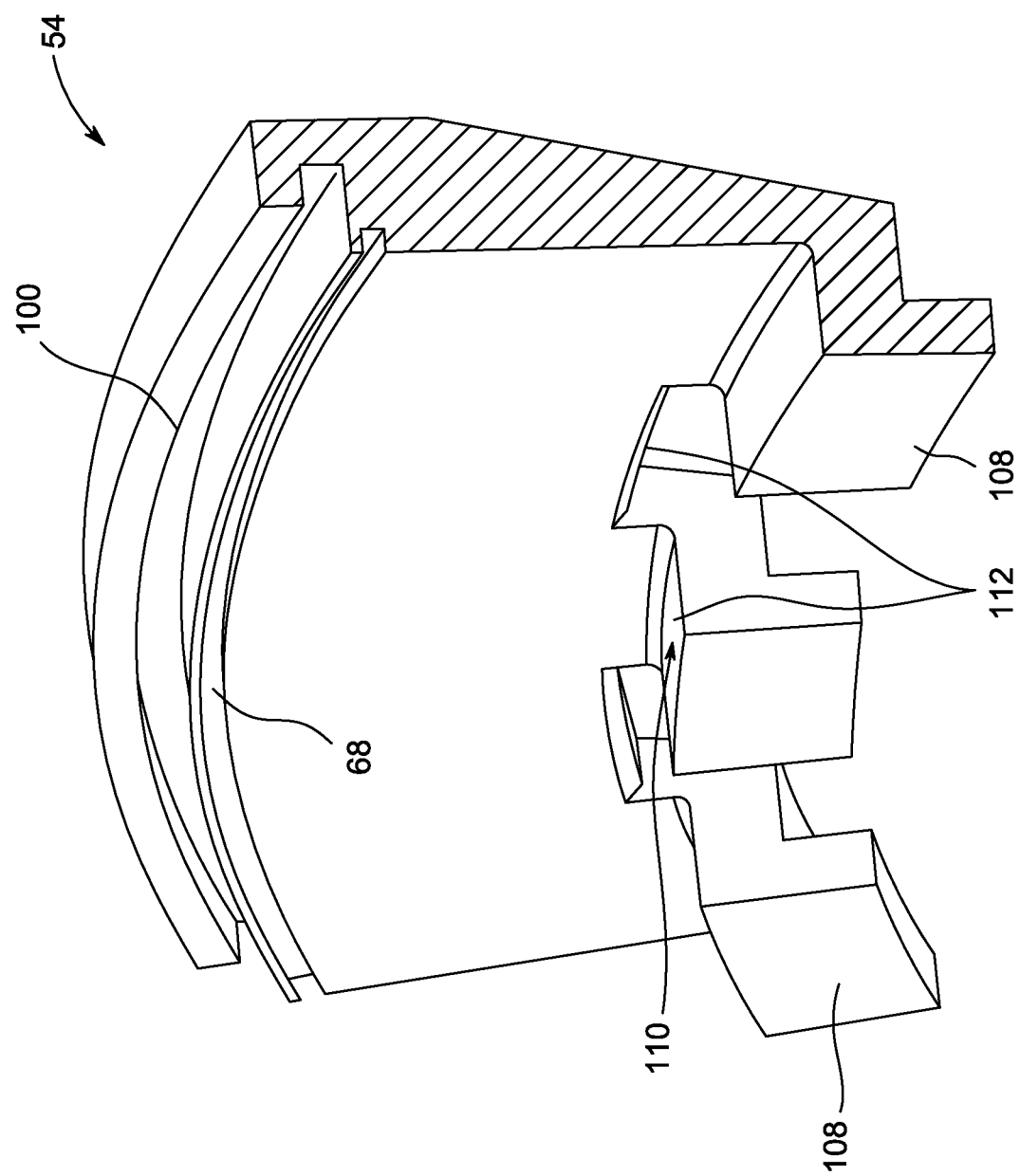
FIG. 5 is a perspective view of the forward coverplate of the interstage seal subsystem in accordance with an example of the present technology.

FIG. 5 is a perspective view of the forward coverplate 54 of the interstage seal subsystem 42 in accordance with an example of the present technology. As shown, the forward coverplate 54 includes a plurality of scalloped L-shaped seats 108 at inner end for enabling radial and circumferential retention when mounted on the side of the first turbine wheel 56 having the plurality of tab protrusions 76 on inner diameter of the wheel rim (as shown in FIG. 4). Each of the plurality of scalloped L-shaped seats 108 includes a landing face 110 that are completely engaged with the first turbine wheel 56 when mounted. The forward coverplate 54 also includes multiple radial retention features 112 that further enable radial and circumferential retention of the forward coverplate 54. The forward coverplate 54 also shows the seal wire groove 68 and a first support land structure 100 for supporting the near flow path seal segment 48 when mounted.

Figure 6:
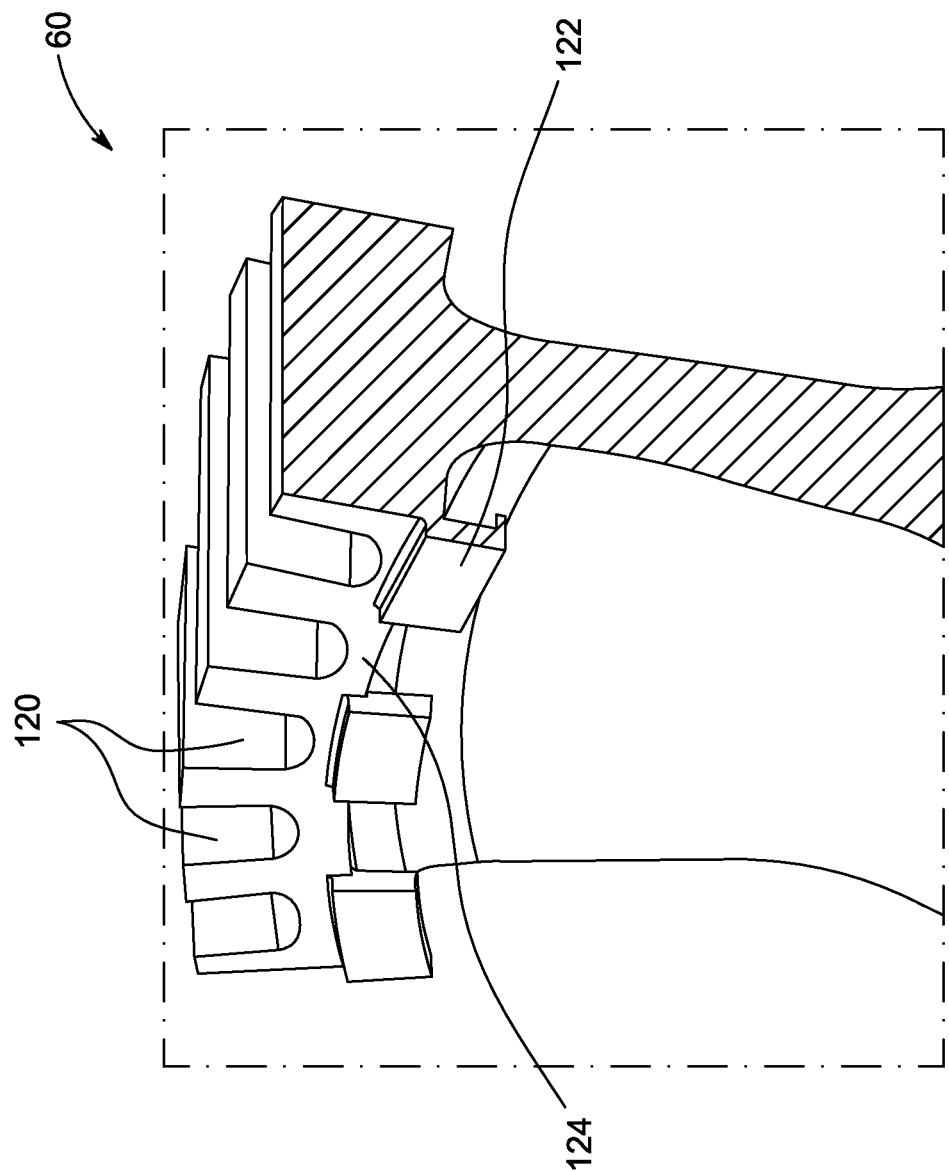
FIG. 6 is a perspective view of the second turbine wheel of the gas turbine in accordance with an example of the present technology.

FIG. 6 is a perspective view of the second turbine wheel 60 of the gas turbine in accordance with an example of the present technology. As shown, the second turbine wheel 60 includes multiple dovetail slots 120 configured for mounting a plurality of buckets or blades (not shown). The second turbine wheel 60 also illustrates the multiple tab protrusions 122 on the inner diameter of the wheel rim 124 in a radially inward direction. As shown, each of the multiple tab protrusions 122 spans to one dovetail slot width circumferentially and is spaced apart by one dovetail slot width. It is to be noted that outer diameter of the wheel rim 126 does not include any hooks.

Figure 7:
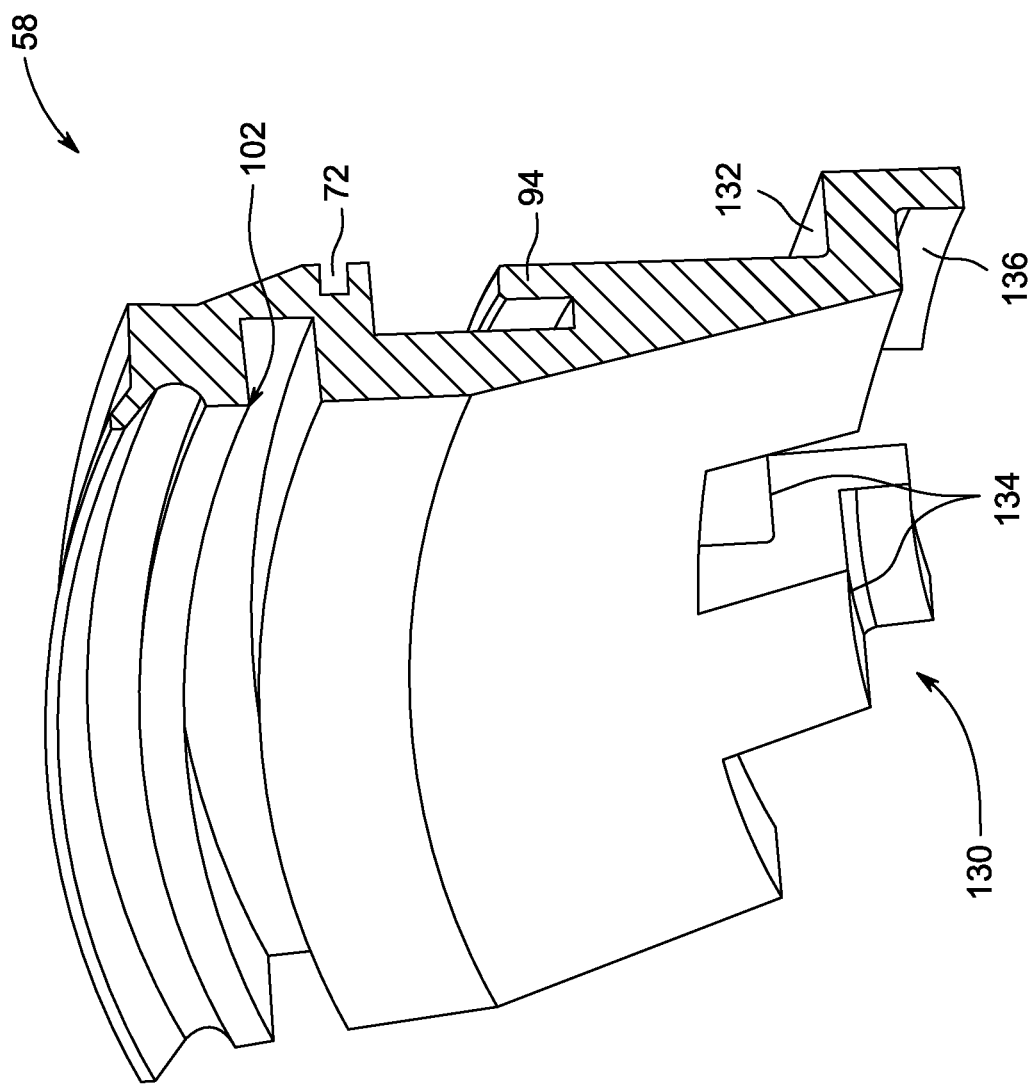
FIG. 7 is a perspective view of the aft coverplate of the interstage seal subsystem 42 in accordance with an example of the present technology.

FIG. 7 is a perspective view of the aft coverplate 58 of the interstage seal subsystem 42 in accordance with an example of the present technology. As shown, the aft coverplate 58 includes a plurality of scalloped L-shaped seats 130 at inner end for enabling radial and circumferential retention when mounted on the side of the second turbine wheel 60 having the plurality of tab protrusions 122 on inner diameter of the wheel rim (as shown in FIG. 6). Each of the plurality of scalloped L-shaped seats 130 includes a landing face 132 that are completely engaged with the second turbine wheel 60 when mounted. The aft coverplate 58 also includes multiple radial retention features 134 that further enable radial and circumferential retention of the forward coverplate 54. As shown is an area 136 that provides for space for the aft axial retention ring 78. The aft coverplate 58 also shows the seal wire groove 72 and a second support land structure 102 for supporting the near flow path seal segment 48 when mounted. The aft coverplate 58 also shows the retention hook portion 94 located on the side facing the second turbine wheel 60 for axial retention with each of a bucket retention hook 96 (shown in FIG. 3) of the second stage buckets 64 (shown in FIG. 3). Further, the aft coverplate 58 also shows the angel wing structure 90 at the radially outward end.

Figure 8:
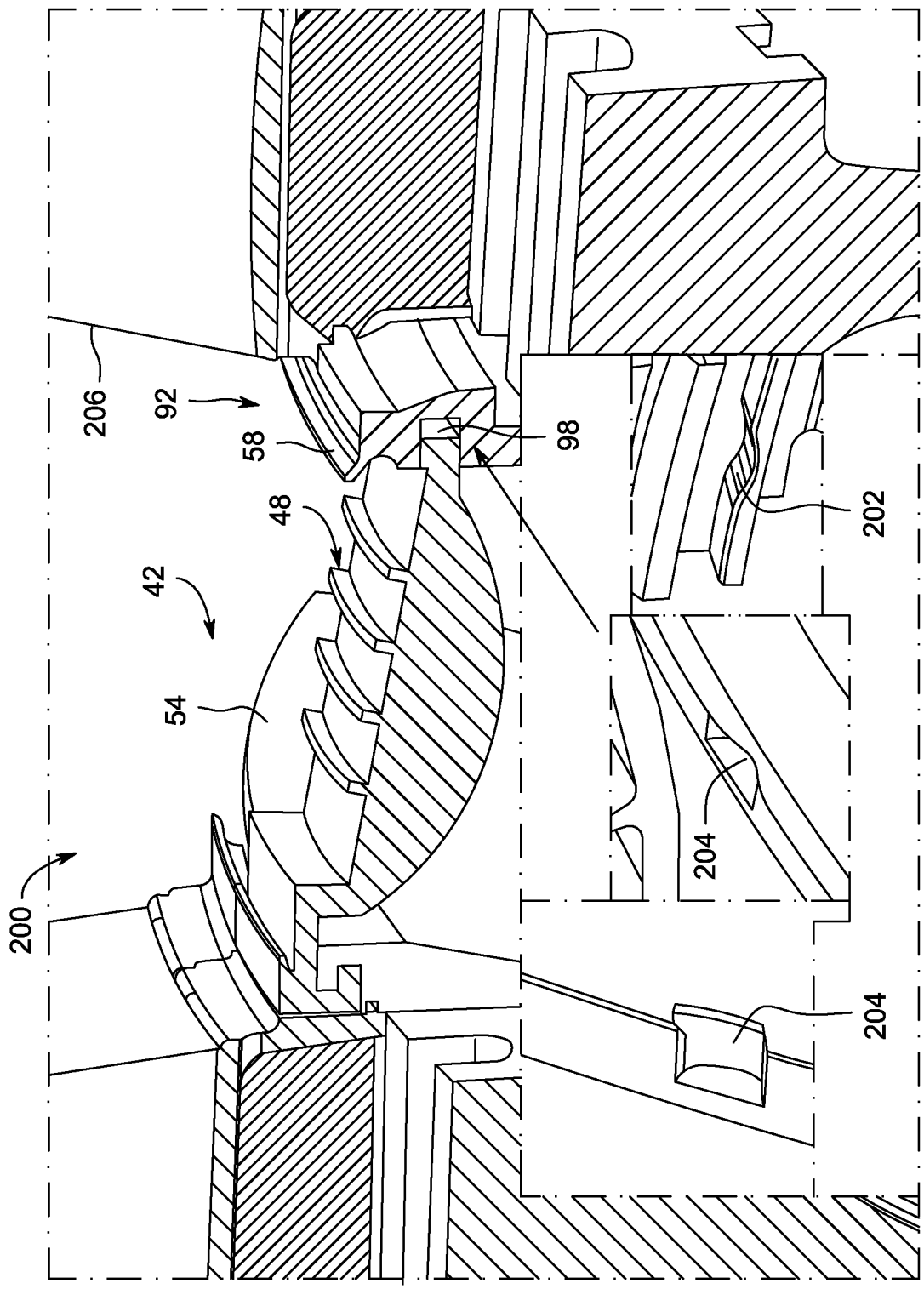
FIG. 8 is a perspective view of a sealing system having the interstage seal subsystem in accordance with an example of the present technology.

FIG. 8 is a perspective view of a sealing system 200 having the interstage seal subsystem 42 in accordance with an example of the present technology. As illustrated in an expanded view, at the aft end 92, the receiving structure 98 is in a locking position with the aft end of the near flow path seal segment 48. The receiving structure 98 includes a plurality of recessed roundcuts 202 that allows locking with a plurality of protruding tabs 204 located underside of the near flow path seal segment 48 at the aft side 92 for circumferentially constraining the near flow path seal segment 48. It is to be noted that the plurality of near flow path seal segments 48 disposed on the interstage seal subsystem 42 may be less in number as compared to buckets disposed on either a first stage or a second stage of the multi-stage turbine. In one embodiment, the sealing system 200 includes a wear resistant coating, for example, hard coating on all contact surfaces between the forward coverplate 54, the aft coverplate 58 and the near flow path seal segment 48 for mitigating wear. In another embodiment, the aft coverplate 58 extends to a plurality of flange bolts (not shown) disposed on a plurality of buckets 206 for allowing bucket cooling flow supply conduits. The system 200 may also include a plurality of second interstage seal subsystems (not shown) and a plurality of third interstage seal subsystems (not shown) extending axially between the second turbine stage and a third turbine stage (not shown) of the multi-stage turbine and between the third turbine stage and a fourth turbine stage respectively.

Figure 9A:
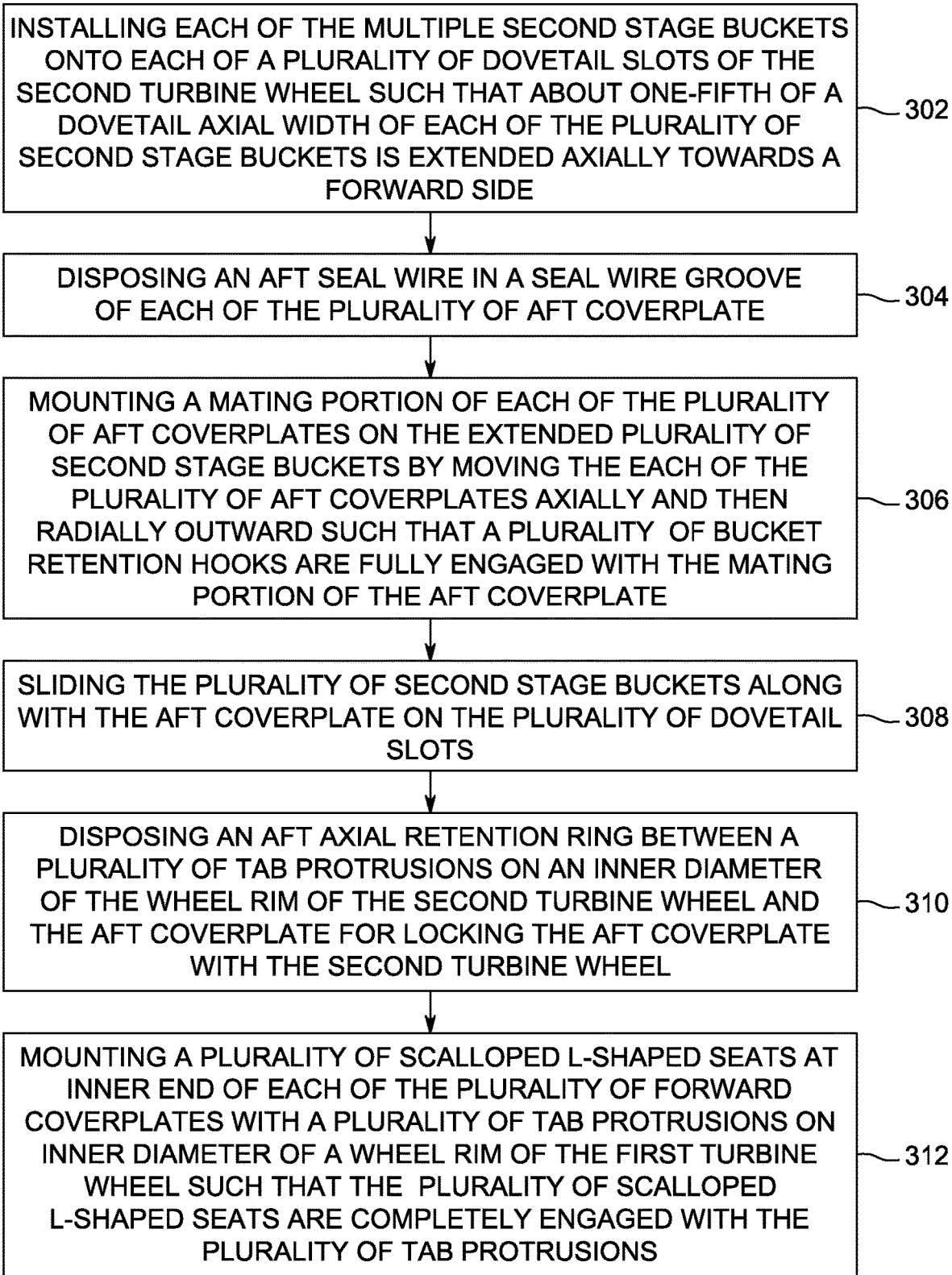
FIG. 9A is flow chart illustrating steps involved in a method of assembling a sealing system of a multi-stage turbine in accordance with an embodiment of the present technology.

FIG. 9A is flow chart 300 illustrating steps involved in a method of assembling a sealing system of a multi-stage turbine in accordance with an embodiment of the present technology. At step 302, the method includes installing each of the multiple second stage buckets onto each of a plurality of dovetail slots of the second turbine wheel. In one embodiment, about one-fifth of a dovetail axial width of each of the plurality of second stage buckets is extended axially towards a forward side. In other embodiments, span of the dovetail axial width of each of the plurality of second stage buckets which extend axially towards a forward side may vary. At step 304, the method includes disposing an aft seal wire in a seal wire groove of each of the plurality of aft coverplates. At step 306, the method includes mounting a mating portion of each of the plurality of aft coverplates on the extended plurality of second stage buckets by moving the each of the plurality of aft coverplates axially and then radially outward such that a plurality of bucket retention hooks are fully engaged with the mating portion of the aft coverplate, wherein the mating portion comprises a retention hook structure. Prior to mounting the plurality of aft coverplates on the extended plurality of second stage buckets, the method includes aligning the plurality of bucket retention hooks of the extended plurality of second stage buckets with the mating portion of each of the plurality of aft coverplates.

Further at step 308, the method includes sliding the plurality of second stage buckets along with the aft coverplate on the plurality of dovetail slots. Furthermore, at step 310, the method includes disposing an aft axial retention ring between a plurality of tab protrusions on an inner diameter of the wheel rim of the second turbine wheel and the aft coverplate for locking the aft coverplate with the second turbine wheel. At step 312, the method includes mounting a plurality of scalloped L-shaped seats at inner end of each of the plurality of forward coverplates with a plurality of tab protrusions on inner diameter of a wheel rim of the first turbine wheel such that the plurality of scalloped L-shaped seats are completely engaged with the plurality of tab protrusions. The method also includes disposing a forward seal wire in a seal wire groove of each of the plurality of forward coverplates prior to mounting the plurality of forward coverplates on the first turbine wheel.

Figure 9B:
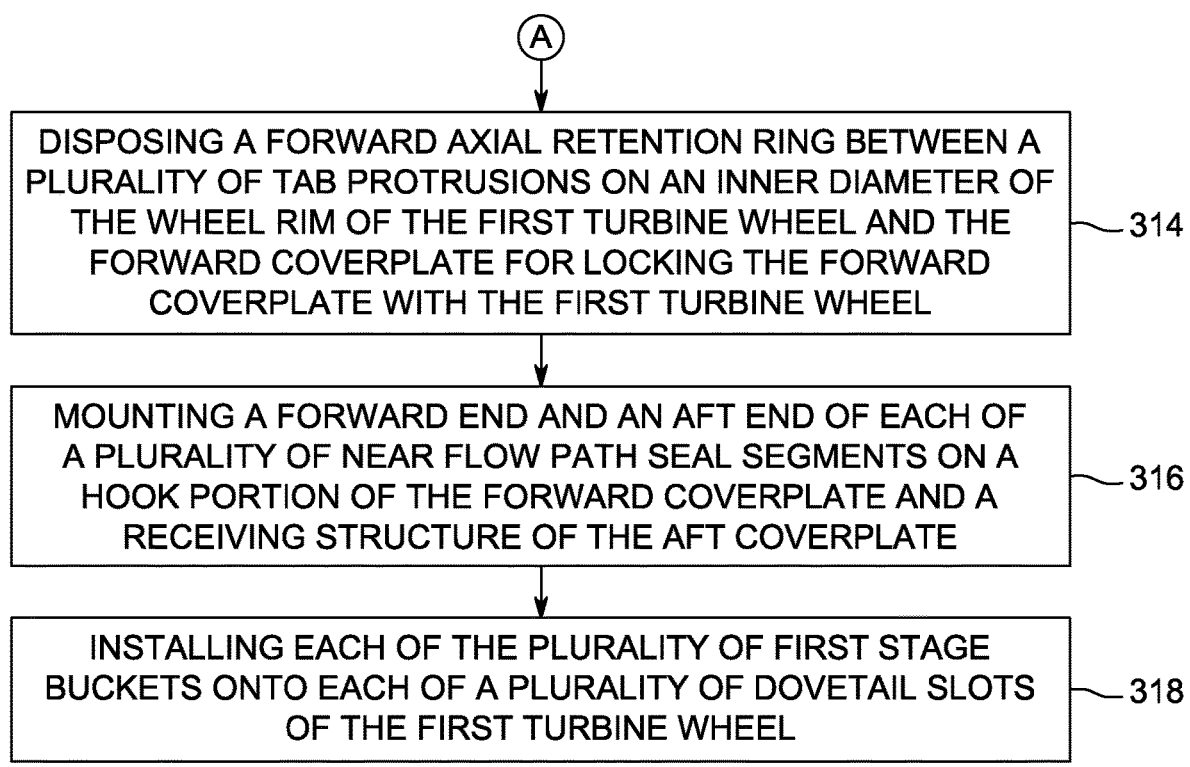
FIG. 9B is flow chart illustrating steps involved in a method of assembling a sealing system of a multi-stage turbine in accordance with an embodiment of FIG. 9A.

FIG. 9B is flow chart illustrating steps involved in a method of assembling a sealing system of a multi-stage turbine in accordance with an embodiment of FIG. 9A. Further, at step 314, the method includes disposing a forward axial retention ring between a plurality of tab protrusions on an inner diameter of the wheel rim of the first turbine wheel and the forward coverplate for locking the forward coverplate with the first turbine wheel. At step 316, the method includes mounting a forward end and an aft end of each of a plurality of near flow path seal segments on a hook portion of the forward coverplate and a receiving structure of the aft coverplate and finally installing each of the plurality of first stage buckets onto each of a plurality of dovetail slots of the first turbine wheel at step 318. Furthermore, the method may also include disposing intersegment spline seals between adjacent near flow path seal segments.

Advantageously, the present sealing system is reliable, robust seal for several locations in gas turbines with high pressure drops and large transients. The seal assemblies are also economical to fabricate and leads to significant cost reduction stemming from spacer wheel material savings. Thus, the present sealing system also enhances power density and reduces the secondary flows. The present sealing system also allows for flange bolted rotor architecture, field replacement with only bucket stage removed, and flow path variability. The present sealing system provides flexibility to radially position the bolted flange and dissembling of blade rows is not required. The present sealing system may also use reduced number of near flow path seal segments leading to fewer intersegment gaps and thereby lesser leakages. The present sealing system also allows for coverplates to extend to a plurality of flange bolts disposed on a plurality of buckets for allowing bucket cooling flow supply conduits. The sealing system also ensures that direction of the load transferred from the near flow path seal segments to the buckets or bucket dovetails is changed so that the load is deterministic. Further, the present sealing system does not necessitate the use of bucket dovetail seals and bucket shank seals.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sealing system for a multi-stage turbine, the sealing system comprising:
 a plurality of first interstage seal subsystems disposed circumferentially about a rotor wheel shaft of the multi-stage turbine and extending axially between a first turbine stage and a second turbine stage of the multi-stage turbine, wherein each of the plurality of first interstage seal subsystems comprises:
a plurality of near flow path seal segments;
a forward coverplate disposed axially between a first turbine wheel of the first turbine stage and the near flow path seal segments, the forward coverplate comprising (i) a hook and (ii) a portion mounted on the first turbine, the portion of the forward coverplate extending part way along a first stage bucket shank, the hook comprising:
a base extending radially outward from the portion of the forward coverplate; and
a prong extending axially from the base towards the first stage bucket shank and defining a first support land for supporting the near flow path seal segments; and
an aft coverplate disposed axially between the near flow path seal segments and a second turbine wheel of the second turbine stage, wherein the aft coverplate extends radially part way along a second stage bucket shank, wherein the near flow path seal segment is mounted on the first support land of the hook of the forward coverplate towards a forward side between the forward coverplate and the first stage bucket shank, wherein the aft coverplate comprises a receiving structure located between a plurality of angel wing lands that constrains the near flow path seal segment at an aft side, and wherein each of the first turbine wheel and the second turbine wheel comprises a plurality of dovetail slots configured for mounting a plurality of buckets or blades.

2. The sealing system of claim 1, wherein a side of the first turbine wheel facing the forward coverplate comprises a wheel rim with a plurality of tab protrusions on an inner diameter of the wheel rim in a radially inward direction.

3. The sealing system of claim 2, wherein the forward coverplate comprises a plurality of scalloped L-shaped seats at inner end for enabling radial and circumferential retention when mounted on the side of the first turbine wheel having the plurality of tab protrusions on inner diameter of the wheel rim.

4. The sealing system of claim 2, further comprising a first seal wire disposed in a seal wire groove of the forward coverplate and located axially between the forward coverplate and the first stage bucket for isolating the wheel rim of the first turbine wheel from a flow of hot gas path.

5. The sealing system of claim 2, further comprising a forward axial retention ring disposed between the plurality of tab protrusions on the inner diameter of the wheel rim of the first turbine wheel and the forward coverplate for locking the forward coverplate with the first turbine wheel.

6. The sealing system of claim 1, wherein a side of the second turbine wheel facing the aft coverplate comprises a wheel rim with a plurality of tab protrusions on an inner diameter of the wheel rim in a radially inward direction.

7. The sealing system of claim 6, wherein the aft coverplate comprises a plurality of scalloped L-shaped seats at inner end for enabling radial and circumferential retention when mounted on the side of the second turbine wheel having the plurality of tab protrusions on inner diameter of the wheel rim.

8. The sealing system of claim 7, further comprising a second seal wire disposed in a seal wire groove of the aft coverplate and located axially between the aft coverplate and the second stage bucket for isolating the wheel rim of the second turbine wheel from a flow of hot gas path.

9. The sealing system of claim 7, further comprising an aft axial retention ring disposed between the plurality of tab protrusions on the inner diameter of the wheel rim the second turbine wheel and the aft coverplate for locking the aft coverplate with the second turbine wheel.

10. The sealing system of claim 1, wherein the aft coverplate comprises an angel wing structure at an outward end of the aft coverplate.

11. The sealing system of claim 1, wherein the aft coverplate comprises a retention hook portion located on a side facing the second turbine wheel for axial retention with each of a bucket retention hook of the second stage buckets.

12. The sealing system of claim 1, wherein the near flow path seal segment comprises an angel wing structure at an outward end towards a forward side of the near flow path seal segment.

13. The sealing system of claim 1, wherein the receiving structure comprises a plurality of recessed roundcuts that allows locking with a plurality of protruding tabs located underside of the near flow path seal segment at the aft side for circumferentially constraining the near flow path seal segment.

14. The sealing system of claim 1, further comprising a plurality of intersegment spline seals located at both sides of each of the plurality of near flow path seal segment for preventing intersegment gap leakages.

15. The sealing system of claim 1, wherein the aft coverplate extends to a plurality of flange bolts disposed on a plurality of buckets for allowing bucket cooling flow supply conduits.

16. The sealing system of claim 1, wherein the plurality of near path seal segments comprise a curved bottom end portion and a horizontally straight top end portion.

* * * * *